UNITED STATES PATENT OFFICE.

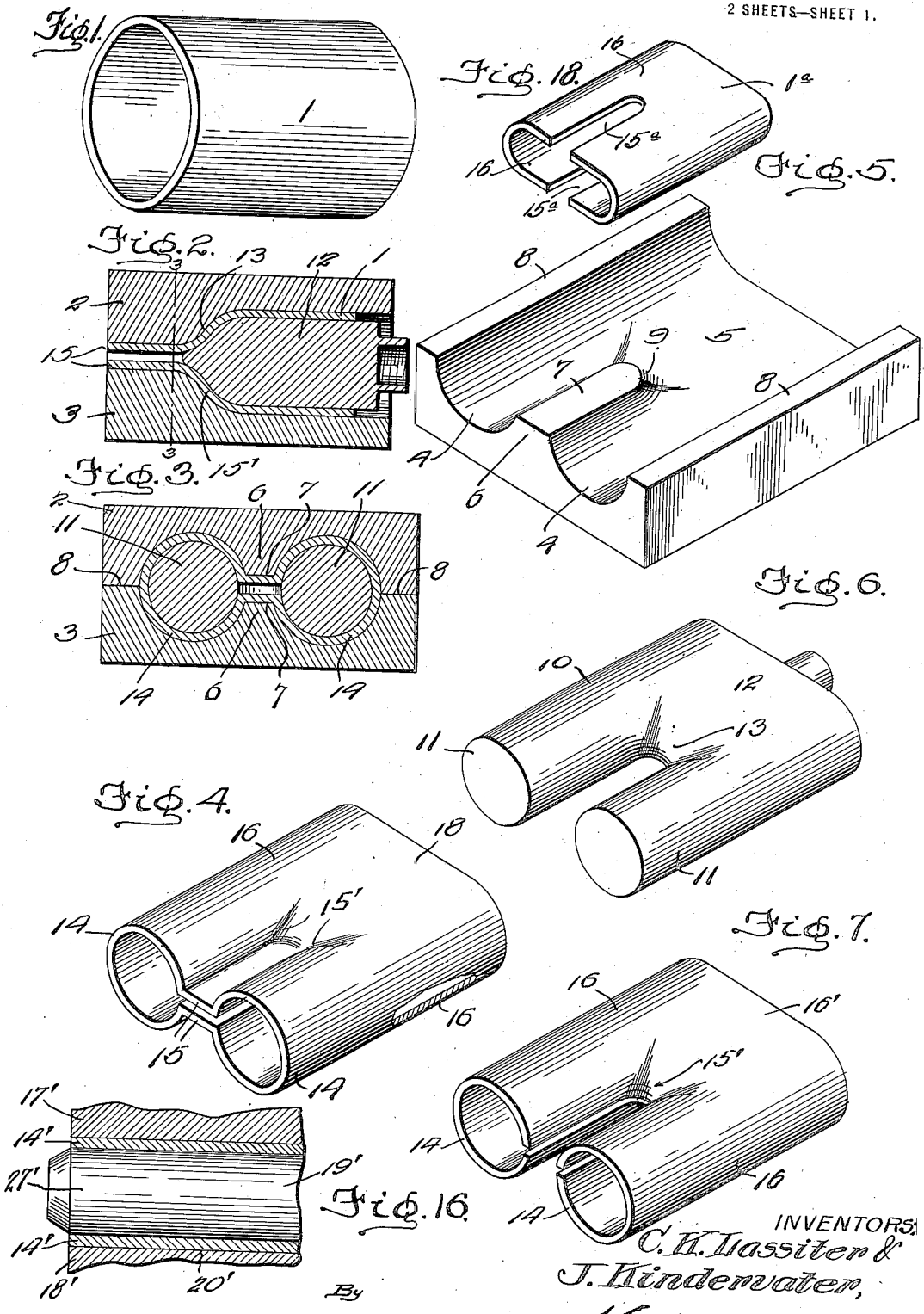

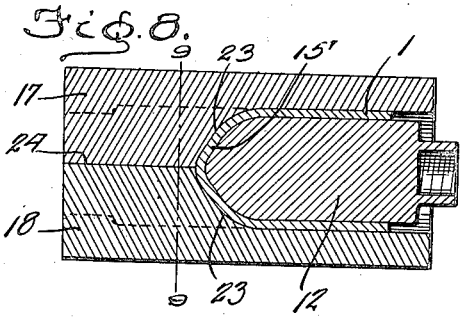
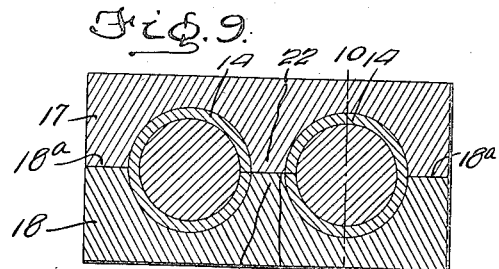
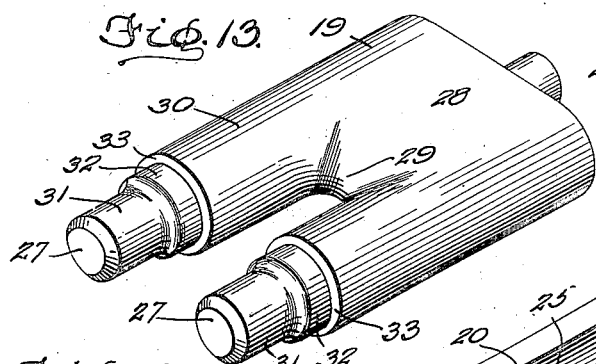
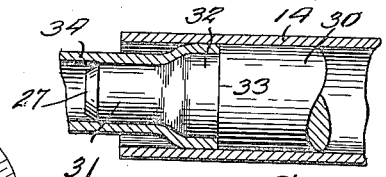
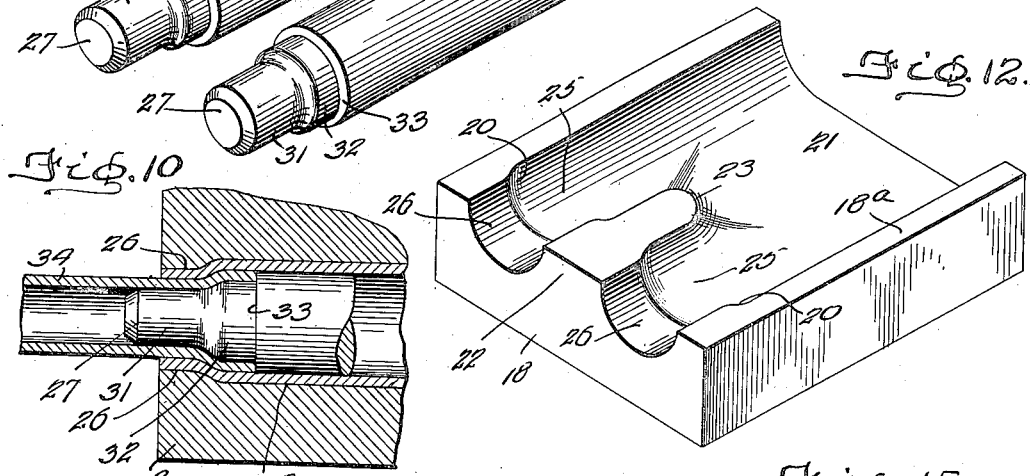
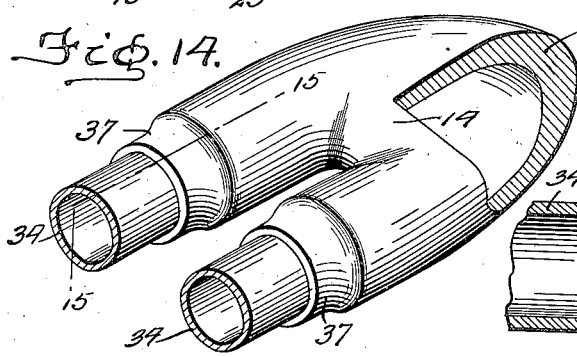
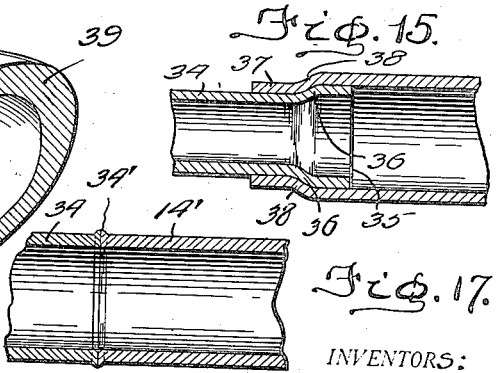

COLUMBUS K. LASSITER AND JULIUS KINDERVATER, OF NEW YORK, N. Y.

DIES FOR MAKING RETURN BENDS.

1,417,394. Specification of Letters Patent. Patented May 23, 1922.

Application filed November 24, 1920. Serial No. 426,247.

*To all whom it may concern:*

Be it known that we, COLUMBUS K. LASSITER and JULIUS KINDERVATER, citizens of the United States, residing at New York, in the county of New York and State of New York, have invented new and useful Improvements in Dies for Making Return Bends, of which the following is a specification.

This invention relates to dies for making return bends of the distinct-unit breeches-type disclosed, for example, in our application for patent executed of even date herewith, filed Nov. 24, 1920, Serial No. 426,246, relating to a method of making return bends of this character.

In such application, Serial No. 426,246, we have set forth a method of making a return bend of unitary construction from a single piece of tubular stock separate from and independent of the pipes or tubes which are to be welded or otherwise suitably joined to the leg portions of the bend. The present invention has for its particular object the provision of dies for use in such a method, whereby the leg-ends of bends of this type may be readily and economically made. A further object of the present invention is to provide dies whereby, if desired, the operation of welding the legs and also welding the pipes thereto may be simultaneously performed. The use of our dies presents an improved method of manufacture which permits of spacing the pipes or tubes further apart than is possible with a return bend formed from the tubes by splitting and welding. In this latter process if a greater distance is desired the introduction of a suitable strip is necessary, requiring four welds to make the bend. The use of our dies also effects a more durable and satisfactory weld of the bend at the crotch point, and enables the pipe ends to be fitted and welded in the legs in such manner as to strengthen and increase the rigidity and durability of the connection.

Our invention will be better understood by reference to the accompanying drawings, in which:—

Figure 1 is a view in elevation of the piece of tubing from which the bend is formed.

Figure 2 is a central longitudinal section through the forming dies and tube, illustrating the first step of the method.

Figure 3 is a transverse section on line 3—3 of Figure 2.

Figure 4 is a perspective view of the incomplete bend as it appears upon completion of the first step of the method.

Figure 5 is a view of one of the forming dies.

Figure 6 is a view of the forming mandrel.

Figure 7 is a view of the incomplete bend illustrating the next step of the process.

Figure 8 is a section similar to Figure 2 of the welding dies and incomplete bend, illustrating the final step in forming and welding the leg-end.

Figure 9 is a transverse section on line 9—9 of Figure 8.

Figure 10 is a longitudinal section on the plane indicated by the line 10—10 of Figure 9, showing the connection of a pipe with a leg of the bend at the completion of the welding operation.

Figure 11 is a section similar to Figure 10, omitting the dies, showing the parts as they appear when fitted in position prior to the welding operation.

Figure 12 is a view of one of the welding dies.

Figure 13 is a view of the welding mandrel.

Figure 14 is a perspective view of the completed bend and pipes joined thereby.

Figure 15 is a detail section on line 15—15 of Figure 14.

Figure 16 is a sectional view similar to Figure 10, illustrating a modification in the operation of closing and welding the leg-end of the bend.

Figure 17 is a detail view illustrating a butt-weld connection between a pipe and leg of the bend.

Figure 18 is a view of a modified form of tubular stock which may be employed.

The improvements constituting our invention are embodied in the die elements shown particularly in Figures 2, 3, 5, 6, 8, 9, 10, 12, 13 and 16, the remaining figures and the description pertaining to them being inserted largely in order that the modus operandi of the dies and character of article produced thereby may be fully and clearly understood.

In carrying our invention into practice, we form the return bend from a piece of steel tubing 1 of suitable length and diameter. This tube is held and preliminarily shaped between two counterpart die members 2 and 3. The lower die member 3 is shown in Figure 5 and comprises a block having at one end two parallel semi-circular grooves 4 merging at their inner ends into a semi-elliptical cross channel or cavity 5. The grooves 4 are separated by an intermediate rib 6 having its inner face 7 terminating a predetermined distance below the horizontal plane of the abutment faces 8 at the sides of the block. The rib 6 has at its inner end a continuation in the form of a substantially triangular or wedge-shaped boss 9 which extends therefrom toward the opposite end of the block and whose upper face inclines or slopes toward the bottom of the channel and merges thereinto. At its apex portion, which joins the inner end of the rib, the boss is of the same width as the rib, the sides of the rib thence diverging and the boss gradually increasing in width until at its base it is both materially shallower and wider than the rib. Before placing the tube in the die members it is raised to a welding heat. The tube is then partially collapsed by pressing or hammering between the dies, a breeches mandrel 10 then inserted into the tube, and the pressing or hammering operation continued until the dies are completely closed and their faces 8 abut. As shown in Figure 6, the mandrel 10 is provided with a pair of parallel cylindrical legs 11 for cooperation with the grooves 4, an elliptical body portion 12 for cooperation with the cavity 5, and a wedge-shaped crotch portion 13 for cooperation with the bosses 9. The compression of the tube between the surfaces of the dies and the mandrel results in the production of the partially completed bend of the form shown in Figure 4, the same having at one end two incomplete tubular legs or sockets 14, split along their inner sides, upper and lower bridge pieces 15 connecting similar edge walls of the incomplete or split legs, and abdominal-shaped crotch-forming webs 15′ connecting said walls and bridge pieces with the body portions of the walls 16 from which they are formed, the opposite end 16′ of the bend being open and of substantially elliptical form in cross section and comprising the part of the incomplete bend which is to be subsequently shaped to form the closed cap portion. It will be observed that the ribs 6 are of relatively less depth than the sides of the dies having the abutment faces 8, and that the rib faces 7 terminate in horizontal planes which lie inwardly of the horizontal planes of said faces 8. Hence when the dies are closed and the faces 8 of the die members abut, the faces 7 of the opposed ribs 6 and the opposed surfaces of the bosses 9 lie in spaced relationship to each other. This spaced relationship is such as to leave the opposed marginal inner edges of the incomplete tubular legs 14, the opposed bridge pieces 15 and the opposed edges of the crotch webs 15′, formed by the die surfaces, in approximate and matching relationship but spread apart. As a result the inner sides of the legs and the crotch portion of the partly completed bend shown in Figure 4 are left open or in bifurcated condition, or, in other words, opposed surfaces of these parts which are to be welded to complete their formation are separated by a narrow gap or slot extending continuously around the inner sides of the legs and the crotch, while at the same time the bridge pieces are correspondingly spaced to form a connecting passage between the slotted sides of the legs and slotted crotch. This is an important feature of construction, for reasons hereinafter fully explained.

The next step of manufacture consists in taking the partially formed bend shown in Figure 4 and, in any suitable manner, punching or cutting out the bridge pieces 15 up to the lines of the webs 15′. If, in this operation, the parts are heated preliminarily to being punched or cut out, the passage formed by the spaced bridge pieces is of advantage in allowing the heat to pass fully around all surfaces of said bridge pieces, so that the same may be easily, quickly and uniformly heated to the desired degree for the punching or cutting action. This leaves the partially complete bend as shown in Figure 7 with the bridge pieces cut away but with the legs and crotch still in open or slotted and incomplete form. Such partially complete bend shown in Figure 7 is then heated to welding heat and subjected to the action of a pair of counterpart welding dies 17 and 18 and a cooperating welding mandrel 19, whereby the legs and crotch are closed and the previously open walls thereof welded to complete the formation of the leg-end proper of the bend.

The welding dies 17 and 18 and the welding mandrel 19 are or may be, with certain exceptions, substantial duplicates of the forming dies 2 and 3 and mandrel 10. As shown by the lower welding die member 18 illustrated in Figure 12, the die members 17 and 18 are each provided with the semi-circular leg-forming grooves 20, shaping cavity 21, rib 22 and boss 23, similar to the portions 4, 5, 6 and 9 of the dies 2 and 3 with the exception that the bridge forming face 24 of the ribs 22 lie in the same plane as the side abutment surfaces 18ᵃ and that said faces 24 and web-forming surfaces of the bosses 23 are of greater depths than the corresponding portions of the dies 2 and 3, and with the further exception that the grooves 20 are formed of relatively deep inner portions 25 and shallow outer portions 26, the portions 25 being of less diameter than the grooves 4 of the dies 2 and 3. The mandrel 19, like the mandrel 10, is provided with the circular leg ends 27, elliptical end portion 28, and wedge-shaped surfaces 29, which are similar to the portions 11, 12 and 13 of the mandrel 10 with the exception that each leg is provided with an inner circular portion 30 of major diameter, an outer circular portion 31 of minor diameter, an intermediate circular shaping surface 32 of mean diameter, and an abutment shoulder 33 at the point of intersection of said surfaces 30 and 31.

The dies 17 and 18 and mandrel 19, specifically constructed as above described, are designed for a specified mode of closing and welding the legs and crotch of the bend and simultaneously lap-welding and mechanically interlocking therein the ends of the tubes or pipes 34 which are to be joined by the bend, which operation we will now proceed to describe, although the invention is not restricted to this particular mode of connecting the pipes 34 with the bend, as the legs and crotch of the bend may first be closed and welded and the pipes 34 then otherwise joined to the legs of the bend, as by butt-welding, as hereinafter fully explained.

Referring to Figures 8 to 15, inclusive, illustrating the use of the dies 17 and 18 and mandrel 19, it is to be understood that the dies, mandrel, bend and pipes having been assembled, with the pipe ends fitted in the split legs, the pipe ends and bend being heated to welding temperature, the normally spaced dies are subjected to hammer blows or pressure until they are fully moved from initial to the fully closed position shown in Figures 8 and 9, in which their abutment surfaces 18$^a$ contact. This action causes the forming surfaces of the dies to contract or shrink the split legs of the bend about the legs of the mandrel and the pipe ends, thereby closing the clefts in the legs and crotch and welding the edge walls thereof together and simultaneously welding the pipe ends within and to the legs. By this operation a strong and durable welding connection is secured, inasmuch as the free space between the legs and the presence of the clefts allows free passage of heat to and between the surfaces to be welded, with the result that they will be uniformly heated and a more perfect weld obtained, while the drawing of the legs about the pipe ends ensures a most perfect connection. It will be observed that the removal of the bridge pieces 15 not only permits this to be done, but is of particular importance in eliminating excess material which is a disturbing factor when electrical resistance welding is resorted to which, for its satisfactory operation, requires the resistance units, i. e., the area of the parts to be heated and welded, to be substantially uniform. The shoulders 33 of the mandrel 19 limit the insertion of the pipe ends 34 to the exact degree while the surfaces 31 fit within and support the pipe ends adjacent to their extremities during the shaping and welding action. The extremity of each pipe end is enlarged or expanded, as at 35, and fits about the mandrel surface 32, thus providing a shoulder 36, and the surfaces 26 of the dies contract the extremities of the legs, as at 37, about the body of the pipe beyond said shoulder 36, forming a shoulder portion 38 in the leg which contacts with and lies beyond the shoulder 36. By this construction a mechanical interlock between the leg and pipe is provided which reinforces the weld and tends to prevent possible separation of the parts under strains and thus adds to the security of the connection. At the conclusion of the leg closing and welding operation above described, the dies and mandrel are removed and the open end of the bend subjected to proper treatment to form a closed cap end 39, as shown in Figure 14, thus completing the operation of forming the bend as an entirety and applying it to the ends of the pipes which are to be connected thereby. We have not described herein any particular way of forming the cap end of the bend, as this may be performed by any of the methods heretofore employed in the art, or by the method set forth in our copending application filed Nov. 24, 1920, Serial No. 426,249.

Instead of simultaneously closing and welding the split walls of the leg-end of the bend and welding the pipe ends therein, we may, as before stated, first complete the formation of the leg-end and then weld the pipes thereto. For this purpose we employ, as shown in Figure 16, dies 17' and 18' which are similar in construction to the dies 17 and 18 except that the grooves 20' are of like diameter throughout, namely, of the same diameter as the portions 25 of grooves 20, and a mandrel 19' which is the same construction as the mandrel 19 except that the legs 27' thereof are of uniform diameter throughout, namely, of the same diameter as the portions 30 of legs 27. Such dies 17' and 18' and mandrel 19' are employed to close and weld the split portions of the leg end of the bend prior to the welding of the pipes and bend together. The closed and welded legs 14' of the bend thus produced, one of which is shown in Figure 17, will be of uniform diameter throughout and may match in diameter the end of the pipe 34 which is to be joined thereto, and these parts may be butt-welded together, as indicated at 34'. Also other ways of connecting pipes to the legs of a return bend so formed may be employed within the spirit and scope of our invention.

In order to avoid the formation of the bridge-pieces 15 and the necessity of cutting them out, we may employ a piece of tubular stock 1$^a$ of the character shown in Figure 18. As shown in this figure, the stock 1$^a$ comprises a flattened tube of elliptical form in cross-section and having its relatively flat and parallel walls 16 provided at one end with cutaway portions or slots 15ª. These slots are designed to receive and admit passage of the ribs 6 of the dies 2 and 3 in the shaping operation, as a result of which an incomplete bend of the form shown in Figure 7, devoid of the bridge-pieces 15 shown in Figure 4, will be directly produced from the piece of tubing, no bridge-pieces 15 being formed to be subsequently cut out. The tube 1ª used may be initially of the elliptical form shown, or it may be reduced to such form from an initially circular form, and in the latter event the slots 15ª may be produced in the stock before or after its change of shape, as desired or manufacturing conditions may require.

A material advantage flowing from the described method of making the leg-ends of return bends by the use of dies of the construction defined is that, by using a certain size of tubular stock, the legs may be spaced farther apart, to correspondingly space the pipes, than is possible with a return bend formed from the pipes themselves by splitting and welding, and, by using different diameters of stock, this spacing may be further increased and varied as desired. This method also provides for a more durable and satisfactory weld of the bend at the crotch and, if so desired, enables the pipe ends to be so fitted and welded within the legs as to greatly strengthen and increase the stability of the connection. Such method also provides for the more uniform and efficient heating of the surfaces to be welded to enable a better weld to be obtained. A stronger and more reliable and efficient circulating unit may also be produced, a very desirable advantage in the manufacture of superheater elements for smoke tube superheaters. Furthermore, the use of our improved dies provides a highly practicable mode of making the leg-end of a bend from a single piece of tubing, allowing stock of this kind to be employed in the production of a complete bend without practical obstacles or disadvantages.

Having thus fully described our invention, we claim:

1. Dies for use in making the leg-end of a return bend from a piece of tubular stock comprising shaping die members having surfaces of a shape adapted for initially compressing one end of the stock to form incomplete leg and crotch portions each having opposed walls separated by a gap, similar walls of said portions being connected by spaced bridge pieces, and welding die members having surfaces complemental to the surfaces of the first-named die members, and adapted after removal of said bridge pieces for compressing said walls and closing said gap and welding the opposed walls together.

2. Dies for use in making the leg-end of a return bend from a piece of tubular stock comprising shaping die members having shaping surfaces of a shape and predetermined depth adapted for initially compressing one end of the stock to form incomplete leg and crotch portions each having opposed walls separated by a gap, similar walls of said portions being connected by spaced bridge pieces, and welding die members having shaping surfaces similar and complemental to and at least in part of relatively greater depth than the surfaces of the shaping dies and adapted after removal of said bridge pieces for compressing said walls and closing said gap and welding the opposed walls together.

3. Dies for use in making the leg-end of a return bend from a piece of tubular stock comprising shaping die elements including members each having suitably formed parallel grooves and an interposed rib of predetermined depths adapted for initially compressing one end of the stock to form incomplete leg and crotch portions each having opposed walls separated by a gap, similar walls of said portions being connected by spaced bridge pieces, and welding die elements including members each having suitably formed parallel grooves and an interposed rib complemental to the grooves and ribs of the first-named dies and adapted after removal of said bridge pieces for compressing and contracting said legs and closing said gap and welding said walls, the ribs of the welding dies being of relatively greater depth than the ribs of the shaping dies to bridge the gap and bring said opposed walls into closed and welding relationship in the compressing action.

4. Means for use in making the leg-end of a return bend from a piece of tubular stock comprising shaping elements embodying a breeches mandrel and coacting die members having suitably formed surfaces adapted for initially compressing one end of the stock to form incomplete leg and crotch portions each having opposed walls separated by a gap, similar walls of said portions being connected by spaced bridge pieces, and welding die elements embodying a breeches mandrel and coacting die members having suitably formed surfaces complemental to the surfaces of the first-named die members and adapted after removal of said bridge pieces for compressing said walls and closing said gap and welding the opposed walls together.

5. In the art of making the leg-ends of return bends, a die for compressing opposed walls of a piece of tubular stock of suitable diameter and thickness for making a bend, said die comprising die members, each consisting of a block having a transverse cavity at one end opening through said end, and having at its opposite end a pair of parallel longitudinal grooves opening into said cavity and a rib disposed between and coextensive in length with said grooves, said grooves and ribs being of suitable form adapted, when the die members are moved from open to closed position, to shape an end of the stock to form opposed walls of split legs and crotch portions and bridge pieces connecting similar walls of said legs and crotch portions, and abutment surfaces on the die members adapted for contact to limit such closing motion of said die members, the said grooves, ribs and abutment surfaces of the die members being of such relative arrangement and depth as to leave the said opposed walls of the legs and crotch portion and the said bridge pieces in relatively spread condition when said abutment surfaces contact on a full closing movement of said die members.

6. Means for use in making the leg-end of a return bend from a piece of tubular stock comprising shaping elements including a breeches mandrel and coacting die members each having suitably formed parallel grooves and an interposed rib of predetermined depths and adapted for initially compressing one end of the stock to form incomplete leg and crotch portions each having opposed walls separated by a gap, similar walls of said portions being connected by spaced bridge pieces, and welding elements including a suitably formed breeches mandrel and coacting die members each having suitably formed parallel grooves and an interposed rib adapted after removal of said bridge pieces for compressing and contracting said legs and closing said gap and welding said walls, the ribs of the welding dies being of relatively greater depth than the ribs of the shaping dies to bridge the gap between the legs and bring said opposed walls into closed and welding relationship in the compressing action.

7. Means for use in making the leg-end of a return bend and lap-welding and mechanically securing the ends of pipes therein, comprising shaping elements of a suitable form adapted for initially compressing one end of a piece of tubular stock to form incomplete split leg and crotch portions each having opposed walls separated by a gap, and welding elements of a suitable form adapted for drawing the walls of said portions together and closing the legs about the ends of pipes fitted therein and welding said walls together and said pipes to said legs, said welding elements having surfaces of a construction adapted to form shoulders upon the legs to engage coacting shoulders on the ends of the pipes.

8. In the art of making the leg-ends of return bends, a die for closing and welding the legs and crotch portion of a bend in which said portions are split and the walls thereof spread and separated by a cleft extending around the inner sides of the legs and said crotch portion, said die comprising opposed members having mating grooves adapted to receive said legs and matching ribs to enter and substantially close the space between the legs, said grooves and ribs providing surfaces adapted in the closing of said die members under compression and in the presence of welding heat to close said cleft and weld the wall surfaces thereof together.

In testimony whereof we affix our signatures.

COLUMBUS K. LASSITER.
JULIUS KINDERVATER.